United States Patent [19]

Stelte

[11] 4,174,468
[45] Nov. 13, 1979

[54] DIGITAL COIN CIRCUIT

[75] Inventor: David J. Stelte, Lombard, Ill.

[73] Assignee: GTE Automatic Electric Laboratories Incorporated, Northlake, Ill.

[21] Appl. No.: 892,526

[22] Filed: Apr. 3, 1978

[51] Int. Cl.² .......................... H04J 3/12; H04M 17/02
[52] U.S. Cl. .............................. 179/6.3 R; 179/15 BY
[58] Field of Search ........... 179/6.3 R, 15 BY, 15 BS, 179/15 A, 6.31, 6.5

[56] References Cited

U.S. PATENT DOCUMENTS

| | | | |
|---|---|---|---|
| 3,278,693 | 10/1966 | Sherstiuk | 179/6.3 R |
| 3,456,081 | 7/1969 | Pharis et al. | 179/6.3 R |
| 3,760,112 | 9/1973 | Busch | 179/6.3 R |
| 3,970,799 | 7/1976 | Colton et al. | 179/15 BY |
| 4,010,328 | 3/1977 | McGuire | 179/6.3 R |

OTHER PUBLICATIONS

*Bell System Technical Journal,* Oct. 1972, pp. 1701-1712, "D2 Channel Bank: Digital Functions".

Primary Examiner—Gerald Brigance
Attorney, Agent, or Firm—Gregory G. Hendricks

[57] ABSTRACT

A circuit which allows a digital network telephone central office to provide coin telephone service without analog-to-digital converters. This circuit controls the transmission of digital data representative of coin telephone control signals. Shift registers are used to store this data for asynchronous transmission to a coin telephone, under control of gating logic circuits which insert one bit periodically in preselected frames of data sent to a coin telephone.

6 Claims, 1 Drawing Figure

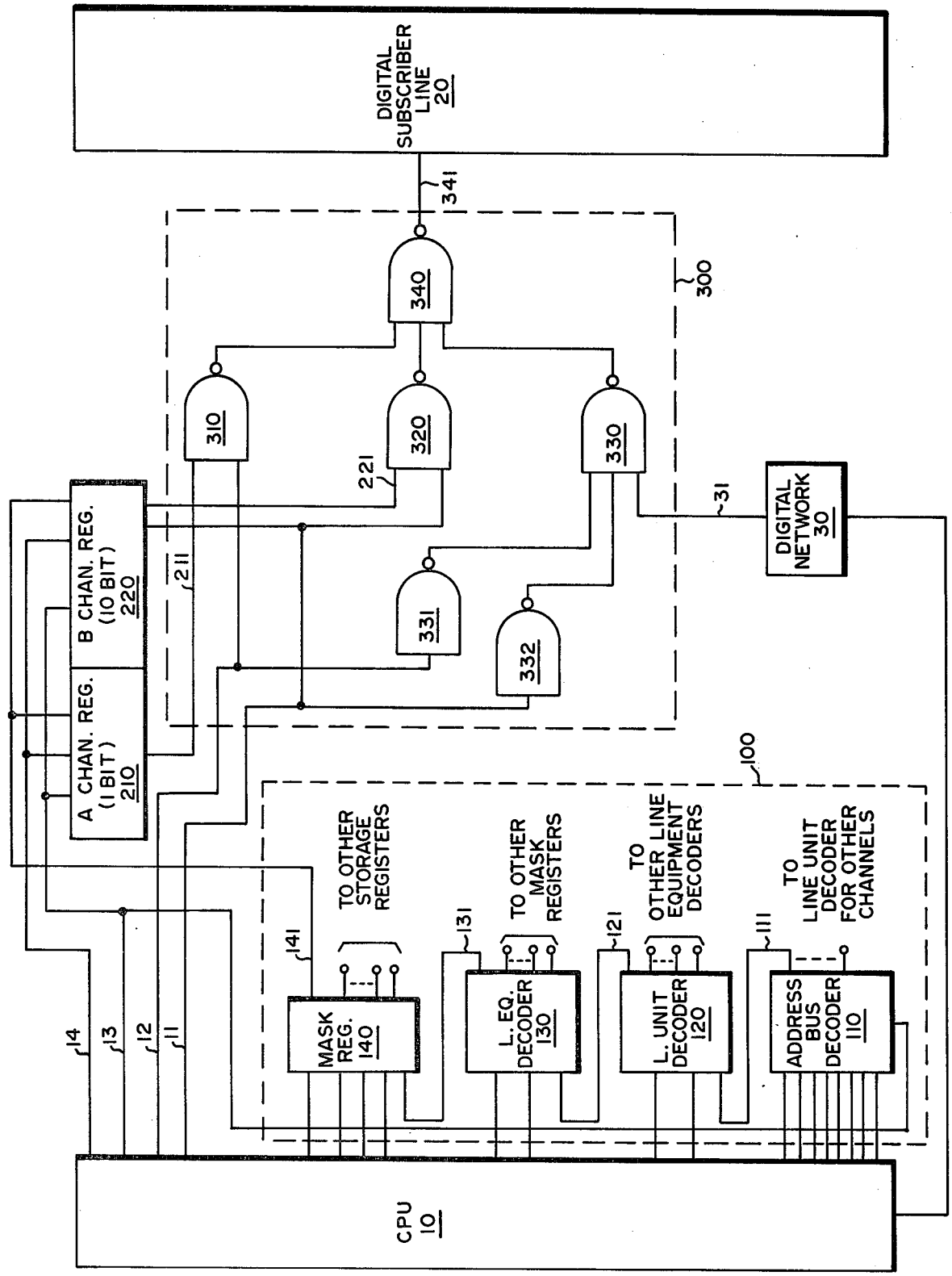

DIGITAL COIN CIRCUIT

BACKGROUND OF THE INVENTION

1. Field of the Invention

The present invention relates to coin telephone service for digital network telephone offices and more particularly to a circuit for inserting digital data representative of coin telephone control signals, in the bit stream of a pulse code modulated transmission line connected to a coin telephone.

2. Description of the Prior Art

Coin telephones are controlled by high voltage signals such as ringing current, coin collect and coin return. These signals cannot be transmitted directly over digital subscriber carrier. Heretofore, when coin telephone service is provided over subscriber carrier, a special office channel unit must be provided on the central office end of the transmission line. This special channel unit must accept coin control signals from the switching system and encode them as digital messages over the PCM transmission line.

When coin telephone service is provided over pulse code modulated transmission lines from a digital central office, the office channel unit or channel bank which is required for analog switching systems, is no longer necessary. It can be eliminated if digital data representative of coin telephone control signal are sent directly from the digital central office to a subscriber channel unit at the end of the PCM transmission line.

Most of the pulse code modulated transmission systems use a standardized technique of transmitting 24 channels of 8 bit words over one transmission line. One additional bit, the S-bit (or sync bit), is sent with these 192 information bits to form a 193 bit frame of data transmitted every 125 microseconds. The S-bit is used by the receiving end to determine which bits are assigned to a given channel. It has also been standardized that the least significant bit of the 8 bit word for each channel will be a signalling bit in every sixth frame.

In order to transmit signalling information for a coin telephone over such a line without using analog signals and analog-to-digital converters, digital data representative of coin telephone control signals must be inserted in the least significant bit of each channel word associated with a coin telephone during every sixth frame of 193 bits sent over the pulse code modulated transmission line.

Since this circuit is used in digital central offices transmitting over pulse code modulated transmission lines using digital interface circuits rather than analog-to-digital converters, these lines are designated digital subscriber lines.

Accordingly, it is the object of this invention to provide a digital coin circuit that will control the transmission of digital bits, representative of coin telephone control signals, from the central processing unit to the appropriate position in the bit stream of a pulse code modulated transmission line.

SUMMARY OF THE INVENTION

The present invention is a circuit which controls the transmission of digital bits representative of coin telephone control signals from the central processing unit to the pulse code modulated transmission line. This circuit is connected in parallel with the digital network such that the digital network bit stream is combined with the coin telephone control signal bits before transmission over the pulse code modulated transmission line.

The digital coin circuit includes a register selection circuit connected to a central processing unit, storage registers connected to the central processing unit and the register selection circuit, and a gating circuit connected to the central processing unit, the storage registers and a digital network. The output of the gating circuit is then connected to a digital subscriber line.

In order for a digital central office to provide service to a coin telephone over a digital subscriber line, the central processing unit must first load the digital data representative of coin telephone control signals, such as coin collect and coin return, into a register, called the B channel register, for asynchronous transmission to the coin telephone. There is one such register for each coin telephone. The format chosen for these control bits consists of four synchronization bits and six data bits defined for the various control signals. Therefore, ten bit registers were chosen to store this information. These registers are shift registers which are clocked by a periodic timing pulse generated by the central processing unit for every twelfth S-bit. Consequently, the least significant bit of the 10 bit coin control word is available for insertion in the least significant bit position of every twelfth frame of data for each channel connected to a coin telephone.

An additional one bit register is also loaded by the central processor for additional control signal information to be transmitted over the digital subscriber line. Since digital subscriber service has standardized on providing control signal information during every sixth frame, this additional bit is also inserted in the digital subscriber lines bit stream during every twelfth frame of data sent to a coin telephone. However, this twelve frame sequence is skewed from that associated with the shift register by six frames. Thus, the one bit, or A channel, register makes its bit available for transmission during every twelfth frame beginning with the frame 0 and is called the A channel signalling bit, and the shift register makes its least significant bit available for transmission during every twelfth frame beginning with the frame 6 and is called the B channel signalling bit.

Control logic then gates the output of each A channel register into the least significant bit of each coin channel word in response to a synchronization signal from the central processor occurring once for every twelfth frame beginning with the sixth frame for A channel signalling. This control logic also gates the least significant bit of each B channel shift register into the least significant bit of each coin channel word in response to another synchronization signal occurring once for every twelfth frame beginning with the twelfth frame for B channel signalling.

These bits are then transmitted over the digital subscriber line and reconstructed into a six bit B channel word and a one bit A channel word by a subscriber channel unit (such as the Lenkurt PCM Subscriber Carrier Unit) at the termination of the digital subscriber line. This commercially available unit then generates an analog representation of these bits and transmits that control signal to the coin telephone.

DESCRIPTION OF THE DRAWING

The single FIGURE of the accompanying drawing is a schematic diagram of a digital coin circuit in accordance with the present invention.

DESCRIPTION OF THE PREFERRED EMBODIMENT

Referring now to the accompanying drawing, the digital coin circuit of the present invention is shown connected in parallel with a digital network 30 and between a central processing unit 10 and a digital subscriber line 20. The digital subscriber line includes both a pulse code modulated transmission line and a digital interface circuit connected to that line.

The digital coin circuit includes a register selection circuit 100 connected to the central processing unit 10, storage registers 210 and 220 connected to the central processing unit 10 and the register selection circuitry 100, and a gating circuit 300 connected to the central processing unit 10, the storage registers 210 and 220, the digital network 30 and an output connection to the digital subscriber line 20.

In a preferred embodiment the digital coin circuit is equipped to provide coin service for 16 pulse code modulated (PCM) transmission lines with a maximum of eight channels per PCM line connected to eight coin telephones. Since there is one pair of storage registers per coin channel there is a maximum of 128 pairs of storage registers per coin circuit.

The register selection circuit 100 enables the appropriate register to be loaded with digital bits representative of coin telephone control signals by the central processing unit. The data structure has been arranged such that only channels 16–23 can be equipped with coin telephones. This data structure has been further defined such that the coin telephone control bits for four channels are contained in one 32 bit word of the central processing units memory. Thus two words are required for each 24 channel PCM line.

The address bus decoder 110 operates in response to the loading signal 13 to select one of these two words and enables the register selection circuit for half of the registers, either channels 16–19 or 20–23. The line unit decoder 120 decodes the first two bits of the selected word and enables one of four line equipment decoders 130. The line equipment decoder, decodes the next two bits and enables one of four groups of mask registers 140. The mask registers then enable any of four storage registers for channels 16–19 or 20–23 depending on the status of the next four bits. The remaining 24 bits of the selected 32 bit word are divided into four groups of coin telephone control bits for the four channels selected. Each group of six bits is loaded into one of the four selected B channel storage registers 220 depending on the status of the mask register. This data is transmitted over the data path 14 and loaded by loading signal 13. The remaining four bits of the B channel register, (data sync bit pattern 0110) are loaded by the loading signal 13 from auxiliary storage. Loading signal 13 also causes the A channel bit to be loaded into the A channel register 210.

The gating circuit 300 is normally operated to gate the digital bit stream from the digital network 30 through gates 330 and 340 to the digital subscriber line 20. This occurs when timing signals 11 and 12 are false. When timing signal 11 is true the least significant bit of the B channel register 220 is gated to the least significant bit position for the eight bit data transmission associated with that channel by gate 320. Timing signal 11 also causes the B channel register to shift one bit position and gate 332 operates in response to timing signal 11 to disable gate 330 and thereby prevent the corresponding digital network bit from being inserted into the digital subscriber lines bit stream.

When timing signal 12 is true the contents of the one bit A channel register is similarly gated into the bit stream by gate 310 and gate 331 operates in response to this signal to disable gate 330 to prevent the corresponding digital network bit from being inserted into the digital subscriber lines bit stream.

The digital bit stream for each 24 channel PCM line consists of eight bits for each channel plus one sync bit for a total of 193 bits. A new 193 bit sample of these 24 channels is transmitted every 125 microseconds. The A channel bit is transmitted during every twelfth frame beginning with frame O and the B channel bit is transmitted during every twelfth frame beginning with frame 6. Therefore, both signals occur every 1.5 milliseconds (125 microseconds × 12) and either an A or B channel bit is transmitted during every sixth frame.

These bits are then transmitted over the digital subscriber line and reconstructed into a six bit B channel word and a one bit A channel word by a subscriber channel unit (such as the Lenkurt PCM Subscriber Carrier Unit) at the termination of the digital subscriber line. This commercially available unit then generates an analog representation of these bits and transmits that control signal to the coin telephone.

The present digital coin circuit thus allows digital telephone switching systems to provide coin telephone service through digital signalling without the need for analog coin telephone control signals or analog to digital converters.

It will be obvious to those skilled in the art that numerous modifications of the present invention can be made without departing from the spirit of the invention which shall be limited only by the scope of the claims appended hereto.

What is claimed is:

1. A digital coin circuit for use in a digital telephone switching system including, at least one multi-channel digital subscriber line connected to at least one coin telephone, a digital network connected to a central processing unit operated to generate, digital data representative of control signals for said coin telephone, a loading signal and a periodic timing signal, said digital coin circuit comprising:

storage means connected to said central processing unit for storage of digital coin telephone control signal bits;

control means connected to said central processing unit, to said storage means and to said digital subscriber line, operated in response to said loading signal to transfer said digital coin telephone control signal bits from said central processing unit to said storage means, and further operated in response to said periodic timing signal to transfer said bits from said storage means to said digital subscriber line for asynchronous transmission to said connected coin telephone.

2. A digital coin circuit as claimed in claim 1, wherein: said storage means includes a register for each channel of said multi-channel digital subscriber line, connected to a coin telephone.

3. A digital coin circuit as claimed in claim 2, wherein: said control means comprise selection means connected to said central processing unit and said storage means, operated in response to said loading signal to transfer said digital coin telephone control signal bits from said central processing unit to a selected register.

4. A digital coin circuit as claimed in claim 2, wherein: said digital network is operated to generate information bits; and said control means further comprise gating means connected to said digital network, said storage means and said digital subscriber line operated in response to an absence of said periodic timing signal to transfer said information bits from said digital network to said digital subscriber line; and further operated in response to presence of said periodic timing signal to transfer each bit stored in said register to said digital subscriber line, in a predetermined bit position of each transmission of said information bits, occurring in synchronism with said periodic timing signal.

5. A digital coin circuit as claimed in claim 2, wherein: said periodic timing signal is divided into first and second timing commands; and said register comprises a multiple bit shift register storing multiple coin telephone control bits operated in response to said first timing command to shift one bit position for each occurrence of said first timing command, and said register further comprises a one-bit register storing another coin telephone control bit.

6. A digital coin circuit as claimed in claim 5, wherein: the least significant bit stored in said shift register is transferred to the least significant bit position of each information transmission occurring in synchronism with said first timing command, and the bit in the one-bit register is transferred to the least significant bit position of each transmission occurring in synchronism with said second timing command.

* * * * *